US009622012B2

(12) United States Patent
Funakoshi

(10) Patent No.: US 9,622,012 B2
(45) Date of Patent: Apr. 11, 2017

(54) AUDIO SIGNAL PROCESSING APPARATUS, MOVIE CAPTURING APPARATUS, AND CONTROL METHOD FOR THE SAME

(71) Applicant: CANON KABUSHIKI KAISHA, Tokyo (JP)

(72) Inventor: Masanobu Funakoshi, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 22 days.

(21) Appl. No.: 14/601,739

(22) Filed: Jan. 21, 2015

(65) Prior Publication Data

US 2015/0208171 A1    Jul. 23, 2015

(30) Foreign Application Priority Data

Jan. 23, 2014 (JP) ................................. 2014-010731

(51) Int. Cl.
*H04S 7/00* (2006.01)
*H04N 5/60* (2006.01)
*G10L 21/0208* (2013.01)

(52) U.S. Cl.
CPC ............ *H04S 7/30* (2013.01); *G10L 21/0208* (2013.01); *H04N 5/602* (2013.01); *G10L 2021/02087* (2013.01); *H04R 2499/11* (2013.01); *H04S 2400/11* (2013.01); *H04S 2400/15* (2013.01); *H04S 2420/07* (2013.01)

(58) Field of Classification Search
CPC ... H04S 7/30; H04S 7/302; H04S 7/40; H04S 2400/11; H04S 2400/15; H04S 2420/07; H04S 2420/11; G10L 21/0208; G10L 2021/02087; H04N 5/00; H04N 5/602; H04R 2499/11

USPC .................. 381/26, 17–23, 92, 119
See application file for complete search history.

(56) References Cited

U.S. PATENT DOCUMENTS

| 4,885,792 | A | * | 12/1989 | Christensen | H04H 60/04 381/119 |
| 5,579,046 | A | * | 11/1996 | Mitsuhashi | H04R 3/005 348/231.4 |
| 7,936,889 | B2 | * | 5/2011 | Aiso | H04H 60/04 369/4 |
| 2009/0141908 | A1 | * | 6/2009 | Jeong | G01S 5/20 381/92 |

(Continued)

FOREIGN PATENT DOCUMENTS

| JP | 2007-005849 A | 1/2007 |
| JP | 2009-122370 A | 6/2009 |

*Primary Examiner* — Vivian Chin
*Assistant Examiner* — Jason R Kurr
(74) *Attorney, Agent, or Firm* — Carter, DeLuca, Farrell & Schmidt, LLP

(57) ABSTRACT

An audio signal processing apparatus acquires a specific audio signal based on at least one of audio signals of multiple sound capturing channels captured by multiple microphones, cancels a signal corresponding to the specific audio signal in the audio signals of the sound capturing channels that are to be used in surround audio signal generation, and, using the specific audio signal and the audio signals in which the signal corresponding to the specific audio signal was canceled, generates a surround audio signal such that the sound source of the specific audio signal is located at a specified direction in the surround sound field.

14 Claims, 13 Drawing Sheets

(56) References Cited

U.S. PATENT DOCUMENTS

2012/0287303 A1* 11/2012 Umeda ............... H04R 3/005
348/231.4
2014/0050326 A1* 2/2014 Vesa ................... H04R 5/04
381/26

* cited by examiner

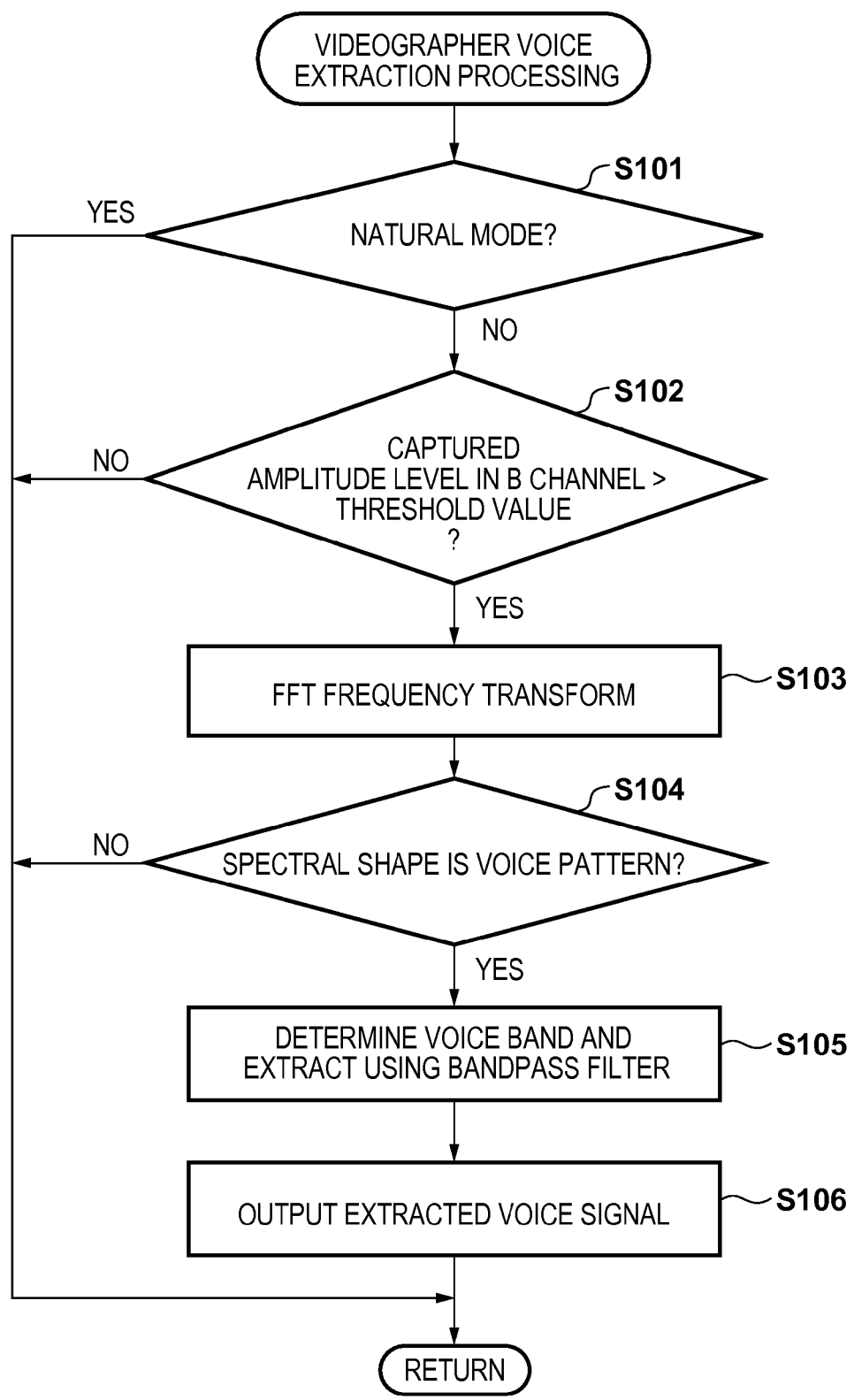

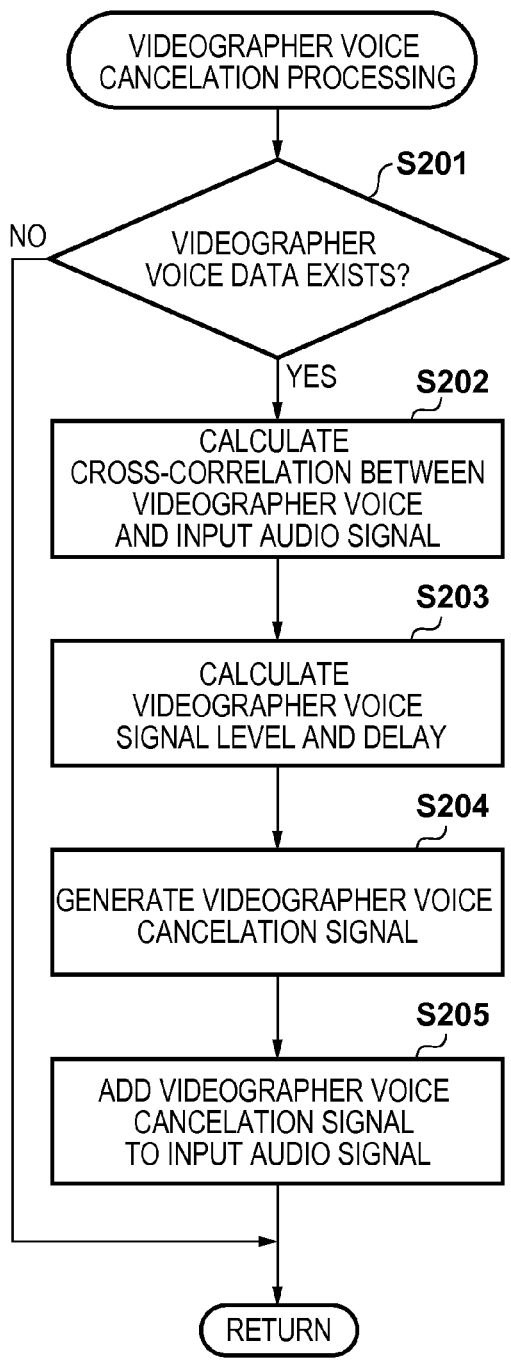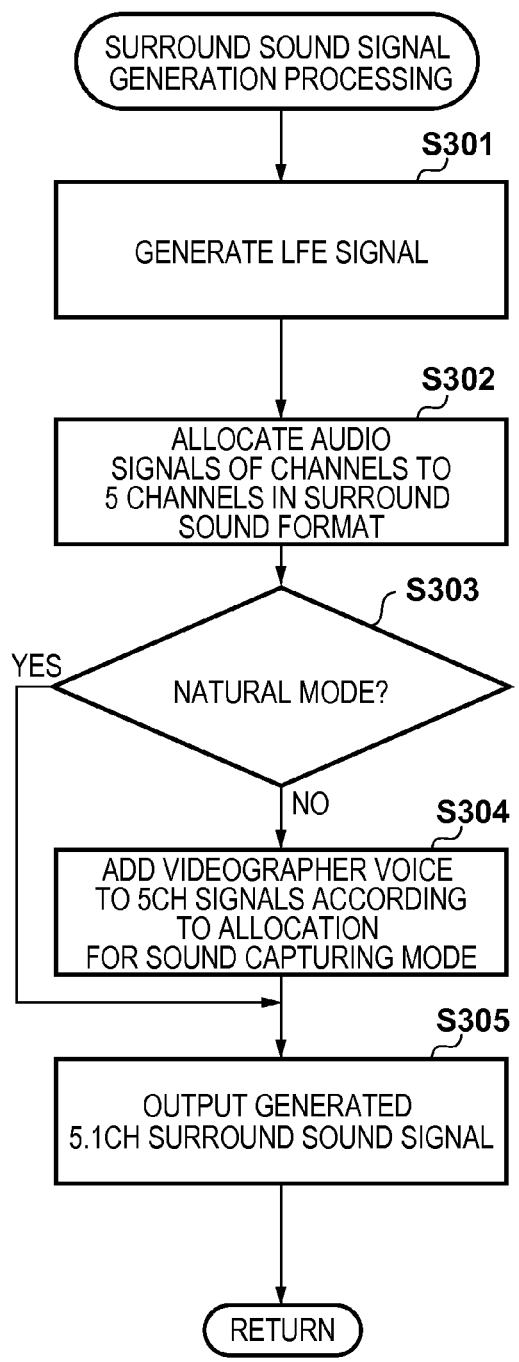

| SOUND CAPTURING MODE | VIDEOGRAPHER VOICE CHANNEL ALLOCATION | | | | |
|---|---|---|---|---|---|
| | FL | FR | C | SL | SR |
| CENTER MODE | 0% | 0% | 100% | 0% | 0% |
| FRONT MODE | 50% | 50% | 0% | 0% | 0% |
| BACK MODE | 0% | 0% | 0% | 50% | 50% |
| ALL CHANNEL MODE | 50% | 50% | 50% | 50% | 50% |
| NATURAL MODE | — | — | — | — | — |
| ANY LAYOUT MODE | 0% | 60.5% | 0% | 0% | 39.5% |

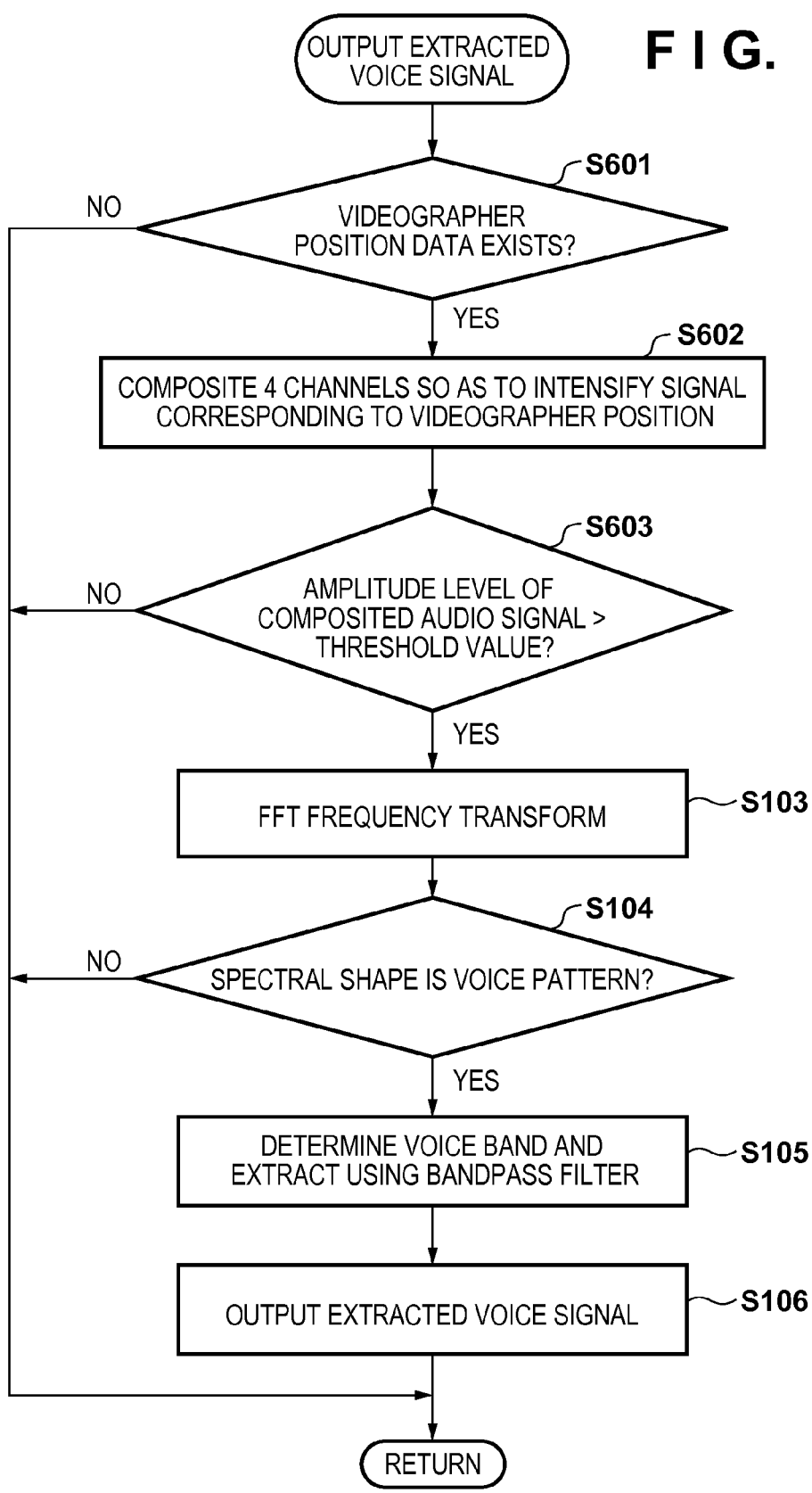

FIG. 15

| SOUND CAPTURING MODE | DESCRIPTION |
|---|---|
| CENTER MODE | OUTPUT VIDEOGRAPHER VOICE FROM CENTER CHANNEL |
| FRONT MODE | OUTPUT VIDEOGRAPHER VOICE FROM FL, FR |
| BACK MODE | OUTPUT VIDEOGRAPHER VOICE FROM SL, SR |
| ALL CHANNEL MODE | OUTPUT VIDEOGRAPHER VOICE FROM ALL CHANNELS |
| NATURAL MODE | OUTPUT VIDEOGRAPHER VOICE WITHOUT MANIPULATION |
| ANY LAYOUT MODE | OUTPUT VIDEOGRAPHER VOICE FROM DESIRED DIRECTION |

FIG. 16

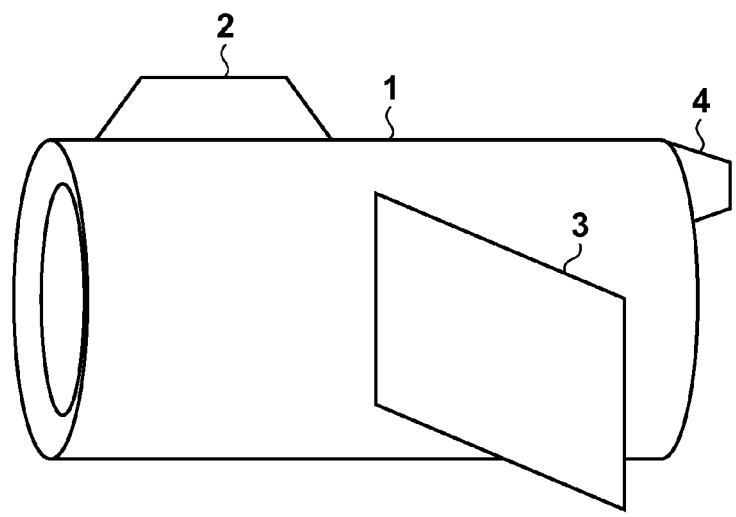

AUDIO SIGNAL PROCESSING APPARATUS, MOVIE CAPTURING APPARATUS, AND CONTROL METHOD FOR THE SAME

BACKGROUND OF THE INVENTION

Field of the Invention

The present invention relates to an audio signal processing apparatus for capturing sound as a surround audio signal, a movie capturing apparatus having the audio signal processing apparatus, and control methods for the same.

Description of the Related Art

In recent years, the prevalence of digital media such as DVD and Blu-ray™ discs, network video distribution, digital TV broadcasting, and the like has made it possible for even households to easily obtain video content containing surround sound. It has therefore become widely common for normal households to have an environment capable of reproducing surround audio signals. Due to this circumstance, the market has seen the entry of normal household movie capturing apparatuses such as camcorders and digital cameras that can also capture and reproduce surround sound.

In some of these movie capturing apparatuses, the upper portion of the casing is provided with a sound capturing unit that has three or more microphones arranged geometrically adjacent to each other, and sound is picked up from all directions in mainly the horizontal plane. Also, some movie capturing apparatuses can use an external microphone array for sound capturing. The audio signals of multiple channels captured by these sound capturing units are subjected to appropriate audio processing and converted into a surround audio signal of the 5.1ch format or the like.

When a surround audio signal is captured using this type of sound capturing unit, the videographer's voice is captured by all of the microphone units, and therefore can be heard as coming from above or behind in the reproduced sound field. Also, the videographer's voice is captured with a high sound pressure due to being at a short distance, and can seem unpleasant in the reproduced sound field in some cases.

Regardless of whether or not a surround audio function is provided, the distance between the videographer and the built-in microphone of general-use camcorders and the like is short, and therefore the voice level of the videographer tends to be higher than that of the subject in the recorded sound. For this reason, innovations have conventionally been made to make it possible to record voice as intended by the user by taking this characteristic into consideration.

For example, Japanese Patent Laid-Open No. 2009-122370 (referred to hereinafter as "Patent Document 1") discloses a technique in which voice recognition is performed on captured audio, and processing is performed using the voice recognition results. Specifically, if the videographer's voice is recognized, the volume of a specific voice is suppressed, for example, by lowering the volume or filtering processing, or controlling the directionality of the microphones.

Also, Japanese Patent Laid-Open No. 2007-005849 (referred to hereinafter as "Patent Document 2") discloses a configuration in which, in a video camera capable of capturing surround sound, a surround sound field suited to the video is captured by changing the directionality, sound capturing level, frequency characteristic, delay characteristic, or the like in surround sound capturing according to the shooting mode. In this case, in a narration mode, which is one example of a shooting mode, the videographer's voice is intensified by raising the volume of the two back channels and intensifying the rearward directionality, and thus the videographer's voice is captured as the principal voice.

However, Patent Document 1 is based on the premise of recognizing the videographer's voice, which leads to an increase in the number of constituent elements, such as a voice recognition apparatus and a voice database, and processing becomes complicated and heavy. Also, in Patent Document 1, the videographer's voice is suppressed by adjusting the microphone amplifier gain or directionality, and consideration is not given to the position of the sound image that corresponds to the videographer's voice. For this reason, envisioning the use of a surround sound function, the videographer's voice will be located rearward, and it will be difficult to adjust the sound image in the surround sound field. Also, although a shooting mode for emphasizing the videographer's voice is prepared in Patent Document 2, the videographer's voice is located rearward in the surround sound field in this case as well, and is furthermore emphasized, thus leading to cases where the sound field seems unnatural.

SUMMARY OF THE INVENTION

According to an aspect of the present invention, an audio signal processing apparatus, a movie capturing apparatus, and control methods for the same make it possible to generate a surround audio signal in which a specific audio signal (e.g., the videographer's voice) among captured audio signals is located at a specified position.

According to one aspect of the present invention, there is provided an audio signal processing apparatus comprising: an acquiring unit configured to acquire a specific audio signal based on at least one of audio signals of a plurality of sound capturing channels captured by a plurality of microphones; a canceling unit configured to cancel a signal corresponding to the specific audio signal in the audio signal of each sound capturing channel to be used in surround audio signal generation; and a generating unit configured to generate a surround audio signal such that a sound source of the specific audio signal is located at a specified direction in a surround sound field, using the specific audio signal and the audio signal in which the signal corresponding to the specific audio signal was canceled by the canceling unit.

According to another aspect of the present invention, there is provided a movie capturing apparatus comprising: the above-described audio signal processing apparatus; the plurality of microphones; an image capturing unit configured to capture moving images simultaneously with audio capturing performed by the plurality of microphones; and a unit configured to generate movie data with voice based on a movie signal generated from the moving images captured by the image capturing unit and the surround audio signal generated by the generating unit.

Furthermore, according to another aspect of the present invention, there is provided an audio signal processing method comprising: an acquiring step of acquiring a specific audio signal based on at least one of audio signals of a plurality of sound capturing channels captured by a plurality of microphones; a canceling step of canceling a signal corresponding to the specific audio signal in the audio signal of each sound capturing channel to be used in surround audio signal generation; and a generating step of generating a surround audio signal such that a sound source of the specific audio signal is located at a specified direction in a surround sound field, using the specific audio signal and the audio signal in which the signal corresponding to the specific audio signal was canceled in the canceling step.

Further features of the present invention will become apparent from the following description of exemplary embodiments with reference to the attached drawings.

BRIEF DESCRIPTION OF THE DRAWINGS

FIG. 7 is a flowchart showing voice extraction processing according to the first embodiment.

FIG. 8 is a flowchart showing voice cancelation processing according to the first embodiment.

FIG. 9 is a flowchart showing audio signal generation processing according to the first embodiment.

FIG. 14 is a flowchart showing voice extraction processing according to the second embodiment.

FIG. 15 is a diagram showing a sound capturing mode list of the movie capturing apparatus.

FIG. 16 is a schematic diagram showing the exterior of a movie capturing apparatus according to a third embodiment.

DESCRIPTION OF THE EMBODIMENTS

Hereinafter, the present invention will be described in detail based on preferred embodiments with reference to the accompanying drawings. Note that the configurations described in the following embodiments are merely examples, and the present invention is not intended to be limited to the illustrated configurations.

First Embodiment

Figure 1:
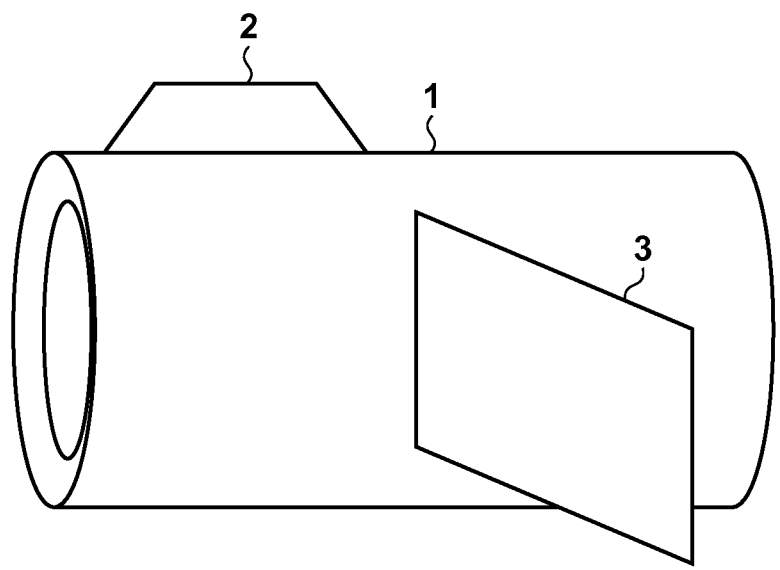
FIG. 1 is a schematic diagram showing the exterior of a movie capturing apparatus according to a first embodiment.

FIG. 1 is a schematic diagram showing an example of the exterior of a movie capturing apparatus according to the first embodiment. In FIG. 1, the movie capturing apparatus has a casing body 1 in which an optical system, processing units for movie signals and audio signals, a recording unit, and the like are provided. The specific configuration of the interior of the casing body 1 will be described later with reference to FIG. 3. A sound capturing unit 2 has multiple microphones, and captures sound for audio signals of multiple sound capturing channels. In the present embodiment, the sound capturing unit 2 is disposed on the upper portion of the casing body 1. The specific configuration of the interior of the sound capturing unit 2 will be described later with reference to FIG. 2. A monitor 3 is a touch panel display equipped with a display such as a liquid crystal panel and a touch sensor function provided by a touch panel or the like. The monitor 3 can display captured movies, and also receive setting instructions, operation instructions, and the like given by a finger directly touching displayed icons and graphics.

Figure 2:
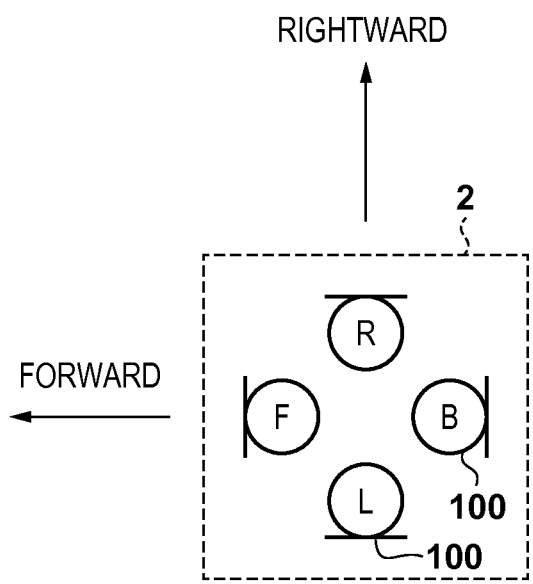
FIG. 2 is a schematic diagram showing an example of a configuration of a sound capturing unit according to the first embodiment.

FIG. 2 is a schematic diagram showing an example of the configuration of the sound capturing unit 2 of the first embodiment. FIG. 2 is a plan view in which the sound capturing unit 2 is viewed from above the casing body 1. As shown in FIG. 2, the sound capturing unit 2 has multiple omnidirectional microphone units 100. In this configuration example, the sound capturing unit 2 has four microphone units 100 that face forward (F), backward (B), leftward (L), and rightward (R) and are arranged in a diamond pattern, and an audio signal for 360 degrees in the horizontal plane can be captured in four sound capturing channels. Note that a similar function can be realized with other microphone arrangement configurations as well, and the present invention can be realized with these other microphone arrangement configurations as well without departing from the gist of the invention.

Figure 3:
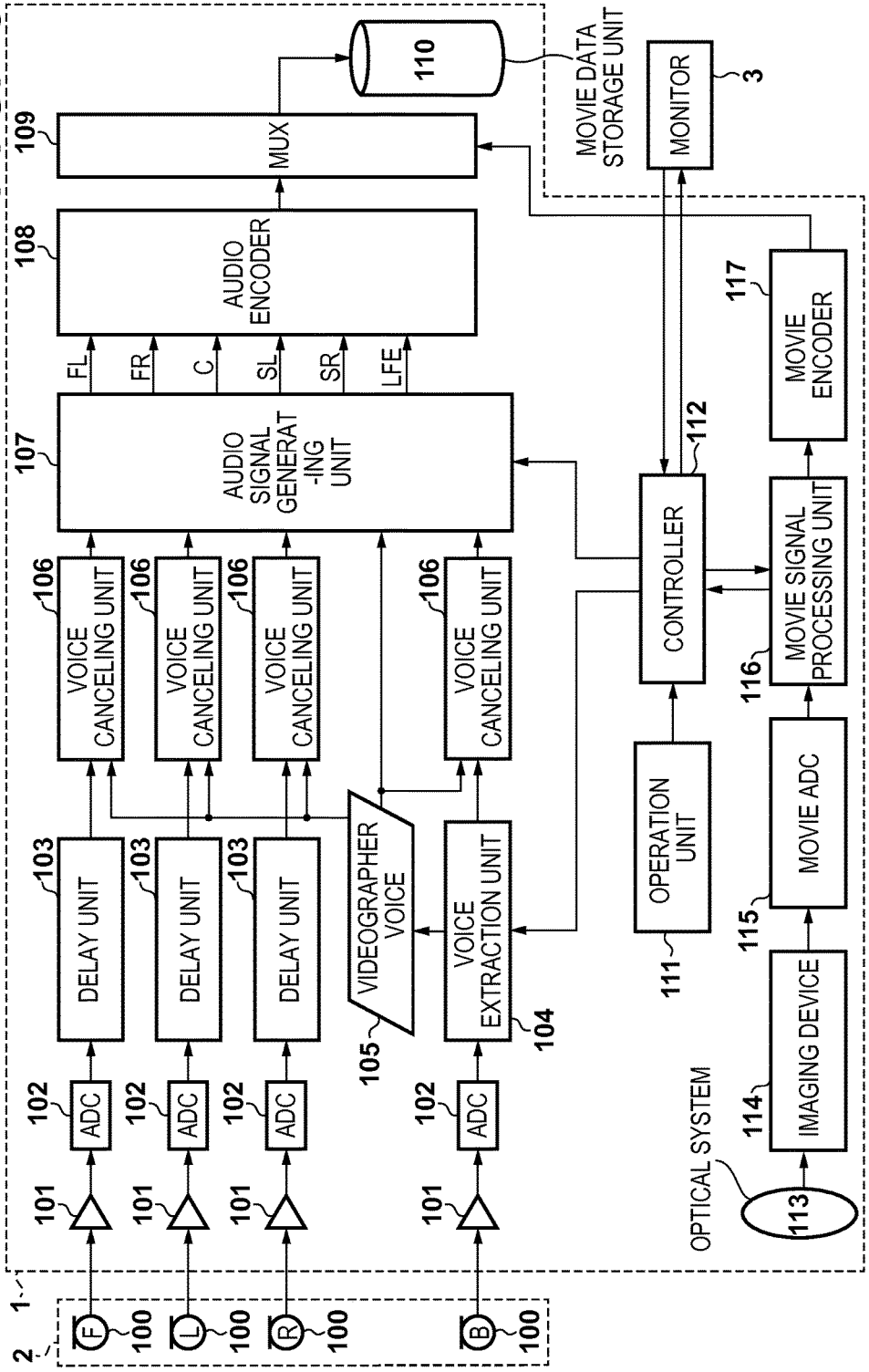
FIG. 3 is a block diagram showing an example of a configuration of the movie capturing apparatus according to the first embodiment.

FIG. 3 is a block diagram showing an example of the internal configuration of the casing body 1 of the movie capturing apparatus according to the first embodiment. The sound capturing unit 2 has the four microphone units 100 as described above, each of which is connected to a microphone amplifier 101. The microphone amplifiers 101 amplify, as necessary, the analog audio signals of the four sound capturing channels (F, L, R, and B) captured by the four microphone units 100 of the sound capturing unit 2. Analog/digital converters 102 (referred to hereinafter as the "ADCs 102") convert the analog audio signals amplified by the microphone amplifiers 101 into digital audio signals (referred to hereinafter as simply "audio signals") and output the digital audio signals. Delay units 103 delay the input audio signals by the same amount of time as the time required by a later-described voice extraction unit 104 to perform processing for extracting the videographer's voice. Specifically, the delay units 103 perform delay processing on the audio signals of the channels other than the B channel so as to achieve synchronization between the B channel audio signal and the audio signals of the other channels (F, L, and R).

In accordance with a control signal transmitted from a controller 112, the voice extraction unit 104 extracts videographer voice data 105 as a specific audio signal from the input audio signal, and outputs the videographer voice data 105. The videographer voice data 105 is the videographer voice signal extracted by the voice extraction unit 104, and although not a constituent element, is shown in FIG. 3 for the sake of the description. Note that in the present embodiment, it is envisioned that the videographer is located rearward of the movie capturing apparatus in consideration of the state of the user during normal shooting, and a configuration is employed in which the videographer voice data is extracted from the B channel audio signal at the farthest position from the shooting lens of an optical system 113. Note that the present invention is not limited to this configuration, and the videographer's voice can be extracted based on the signals of all of the sound capturing channels. An example of this configuration will be described later as a second embodiment.

Voice canceling units 106 cancel the videographer's voice (the signal corresponding to the videographer voice data 105) in the digital audio signals input from the ADCs 102 by compositing the respective digital audio signals with an opposite phase signal of the videographer voice data 105 output from the voice extraction unit 104. An audio signal generating unit 107 generates a 5.1ch surround audio signal by performing signal processing, as necessary, on the audio signals of the four channels in which the videographer's voice has been canceled. Furthermore, the audio signal generating unit 107 performs processing for locating the sound source of the videographer voice data 105 at a specified position in the surround sound field based on the sound capturing mode and layout position information transmitted from the controller 112. This results in the generation and output of a surround audio signal in which the sound source of the videographer voice data is located at a specified position. An audio encoder 108 performs compression encoding on the input surround audio signal to obtain a surround audio encoded signal in an appropriate default format such as AAC or AC-3.

A multiplexer 109 (referred to hereinafter as the "MUX 109") multiplexes the encoded audio signal output from the audio encoder 108 and the encoded movie signal output from a movie encoder 117 so as to correspond to an appropriate default stream format, and outputs the resulting signal. A movie data storage unit 110 successively stores captured movie data. An operation unit 111 receives user instructions such as a start shooting instruction, a pause instruction, and an end shooting instruction, and transmits the received instructions to the controller 112. In accordance with the user operation instruction received by the operation unit 111 or the monitor 3, the controller 112 transmits, to the constituent elements built into the casing body 1, control signals for instructing the constituent elements to perform appropriate operations.

The optical system 113 picks up light from the subject being shot, and sends the light to an imaging device 114. The imaging device 114 uses light receiving elements of a CMOS or the like to pick up the subject light picked up by the optical system 113, and transmits output analog signals from the respective light receiving elements to a movie analog/digital converter 115 (referred to hereinafter as the "movie ADC 115"). The movie ADC 115 converts the analog movie signals output from the imaging device 114 into digital movie signals on a pixel-by-pixel basis. In accordance with an instruction input from the controller 112, the movie signal processing unit 116 subjects the digital movie signals input from the movie ADC 115 to movie signal processing such as resolution conversion, frame rate conversion, and camera shake correction processing. The processing result is then output to the movie encoder 117 and the controller 112. The movie encoder 117 performs compression encoding on the input digital movie signal to obtain a movie encoded signal in a default format such as MPEG-4 AVC, and outputs the movie encoded signal as an encoded movie signal. Movie shooting is performed by the above constituent elements from the optical system 113 to the movie encoder 117, and the encoded movie signal and the encoded audio signal are multiplexed by the MUX 109 to generate movie data with audio.

Figure 6:
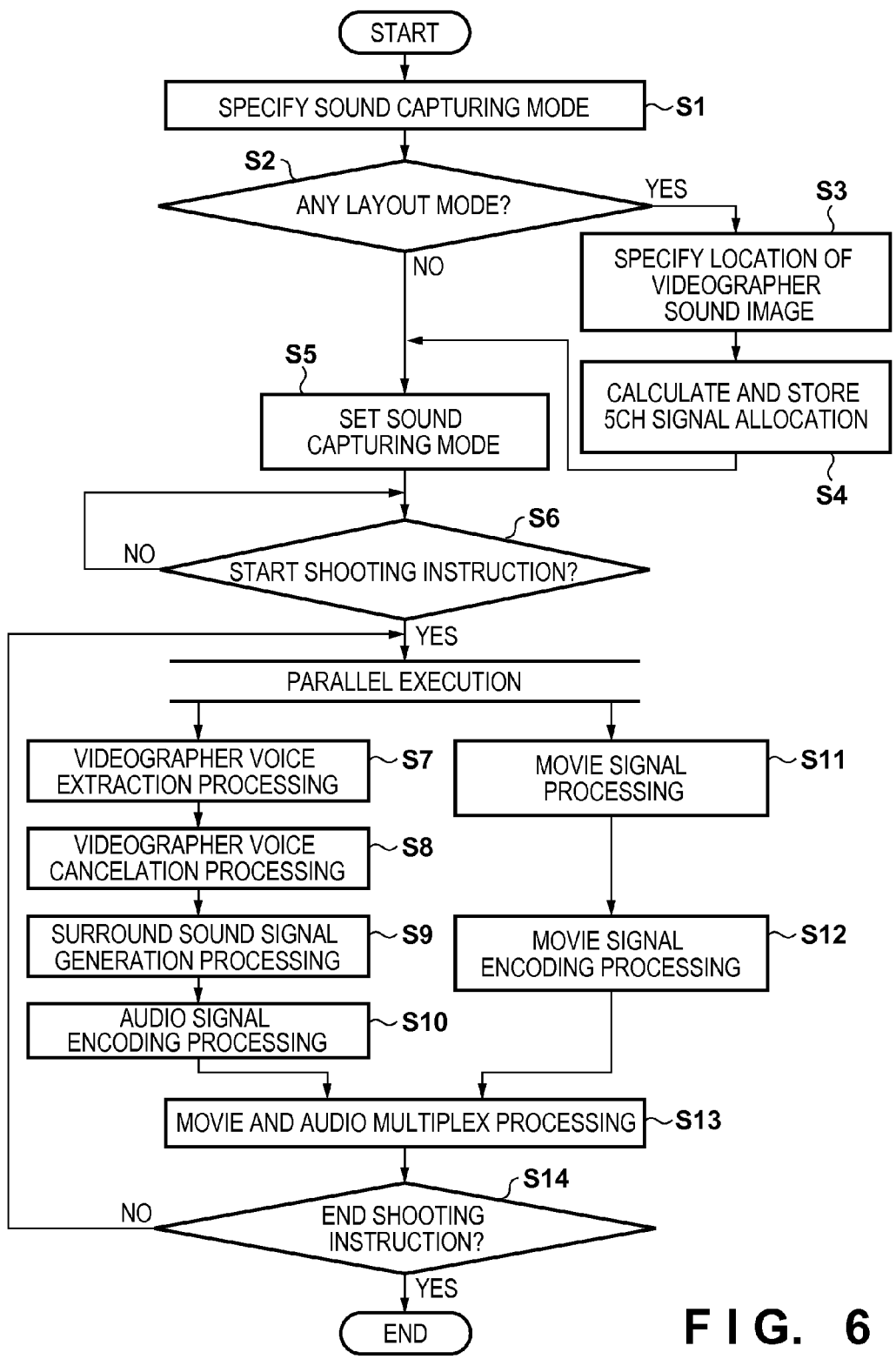
FIG. 6 is a flowchart showing movie capturing processing according to the first embodiment.

The following describes audio signal processing and movie signal processing in the movie capturing apparatus of the first embodiment with reference to the flowchart of FIG. 6. FIG. 6 is a flowchart showing overall movie capturing processing in the movie capturing apparatus according to the first embodiment.

First, in step S1, the controller 112 displays a list of sound capturing modes on the monitor 3, and allows the user to select a sound capturing mode. The sound capturing modes define respective directions of the sound source of the videographer's voice in the surround sound field, and FIG. 15 shows an example of sound capturing modes in the present embodiment. A 5.1ch surround sound field is envisioned in the present embodiment, and in the example of "center mode", the videographer's voice is output from the center channel. When the input of a sound capturing mode selection is received by the operation unit 111 or the monitor 3 from the user, the procedure moves to step S2. In step S2, the controller 112 determines whether or not the mode specified by the user in step S1 is an "any layout mode". If the specified mode is the any layout mode, the procedure moves to step S3, and if the specified mode is another mode, the procedure moves to step S5.

Figure 4:
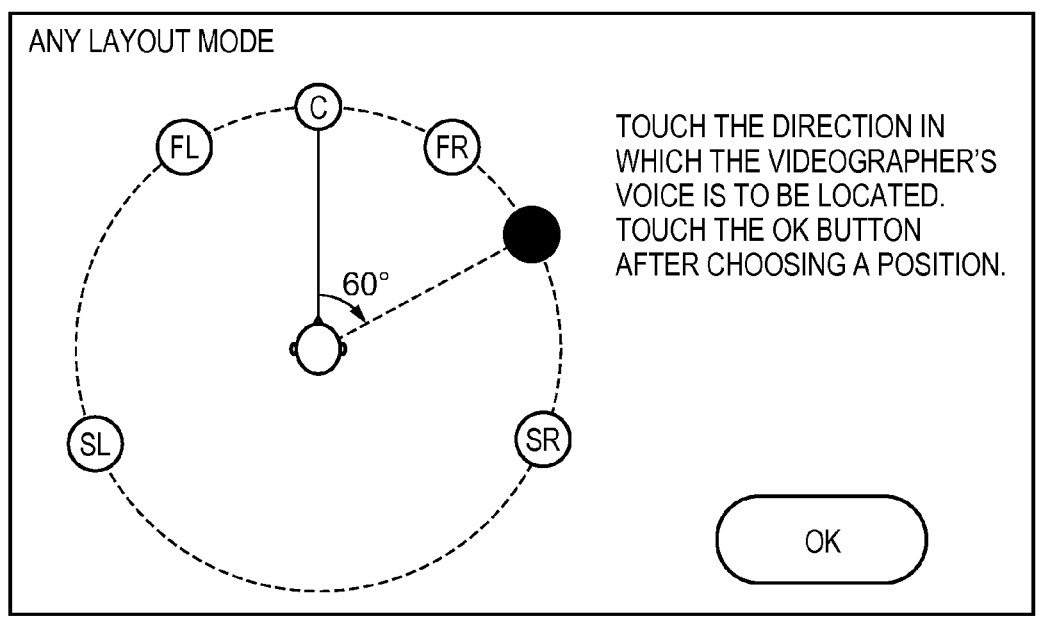
FIG. 4 is a diagram showing a GUI for specifying a sound image position according to the first embodiment.

If the any layout mode was specified, in step S3, the controller 112 displays a sound image layout position specification GUI on the monitor 3, and allows the user to specify the position where the sound image of the videographer's voice is to be located by touching the monitor. FIG. 4 shows an example of the GUI displayed on the monitor 3 at this time. As shown in FIG. 4, in the present embodiment, the presented GUI includes a rendering of a surround loudspeaker layout diagram, and the user is allowed to specify the position of the videographer's voice. When the user touches a position in one of the layout circles in the surround loudspeaker layout diagram on the monitor 3 displaying the GUI, the layout position (direction) of the videographer's voice is displayed by a filled black circle icon on the layout circle. If the user then touches the OK button on the GUI, the layout position having the filled black circle displayed thereon is determined as the specified position. The specified position is converted into an angle relative to straight ahead, which indicates the layout direction. In the present embodiment, the position straight ahead of the listener is deemed to be 0°, positive angles are in the range of rightward rotation from the straight ahead direction to the position straight behind, and negative angles are in the range of leftward rotation to the position straight behind. For example, in the case of the layout shown in FIG. 4, the angle indicating the layout direction of the videographer's voice is 60°.

Next, in step S4, the controller 112 calculates the signal allocation for the videographer's voice in the five channels of the surround sound based on the angle indicating the sound image layout position specified in step S3. In the any layout mode in the present embodiment, the sound image of the videographer's voice in the 5.1ch surround sound field is generated by allocating the videographer's voice to the two channels adjacent on the two sides of the direction in which the sound image is located. This can be realized by determining the signal allocation of the videographer's voice based on the angle formed by the direction in which the sound image is located and the directions of the two adjacent channels. Details of this calculation will be described below with reference to FIG. 10.

Figures 10, 11:
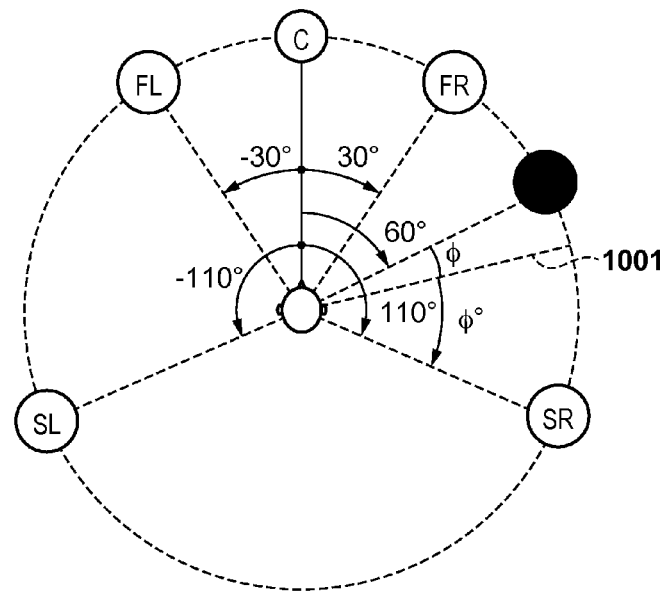
FIG. 10 is a diagram for describing voice signal allocation calculation for sound image locating.
FIG. 11 is a diagram showing a table in which sound capturing modes and videographer voice channel allocations are registered.

FIG. 10 is a schematic diagram for describing 5ch signal allocation with respect to an arbitrary sound image layout position in the present embodiment. The channel layout shown in FIG. 10 is in compliance with the 5.1ch surround loudspeaker standard layout according to the international standard ITU-R BS.775-2. According to the ITU-R standard, in 5.1ch surround sound, the five channels excluding the LFE (Low Frequency Effects) are located at equal distances from the position of the listener, that is to say on a circle centered about the position of the listener. According to the specification, the center speaker (C) is located at 0°, the front left and right speakers (FL, FR) are located at ±30°, and the surround left and right speakers (SL, SR) are located at ±100° to 120°. Note that in the present embodiment, the surround left and right channels are located ±110°.

If the angle of the layout position specified in step S3 is 60°, the sound image layout position is located between the FR (front right) channel and the SR (surround right) channel as shown in FIG. 10. In view of this, signal allocation is performed such that the videographer's voice is allocated to FR and SR, and a virtual sound image is generated at the sound image layout position. In the present embodiment, this allocation is calculated using the tangent law, which is known as a representative amplitude panning method. Here, $\phi_o$ represents the angle from a center line 1001 between the two channels to which the signal is to be distributed, to the respective channel directions, and $\phi$ represents the angle formed by the center line 1001 and the sound source layout position. Furthermore, $w_{FR}$ and $w_{SR}$ represent the amplitude weighting on the respective adjacent channels, and the amplitude weighting of the two channels is determined according to the relationship shown in Equation 1.

$$\tan\phi/\tan\phi_o = (w_{SR} - w_{FR})/(w_{SR} + w_{FR}) \qquad \text{Equation 1}$$

In the case of the example shown in FIG. 10, the angle formed by FR and SR is 110°−30°=80°, and thus $\phi_o$=40°. Also, since the angle of the center line 1001 of the two channels is 70°, the angle formed by the angle of the center line 1001 and the sound source layout position is $\phi$=60°−70°=−10°. Furthermore, assuming the following, $$w_{FR} + w_{SR} = 1 \qquad \text{Equation 2}$$

$w_{FR}$=0.605 and $w_{SR}$=0.395 are calculated using Equation 1.

The signal allocation calculated by the controller 112 as described above is transmitted to the audio signal generating unit 107 and stored in a predetermined area in a voice signal allocation table stored in a memory in the audio signal generating unit 107. FIG. 11 shows an example of the data configuration of the voice signal allocation table. As shown in FIG. 11, the voice signal allocation table defines signal allocations for the videographer's voice in correspondence with the respective sound capturing modes shown in FIG. 10. The signal allocation calculated by the controller 112 in step S4 is saved in the row corresponding to "any layout mode" in the voice signal allocation table. When the above processing ends, the procedure moves to step S5.

In step S5, the controller 112 transmits the sound capturing mode specified in step S1 to the voice extraction unit 104 and the audio signal generating unit 107. The voice extraction unit 104 and the audio signal generating unit 107 each store the received sound capturing mode in an internal memory. Next, in step S6, the controller 112 determines whether or not a start shooting instruction has been given. This determination is made by, for example, checking whether or not a start shooting instruction from the user exists in an input buffer in the operation unit 111. If a start shooting instruction has been given, the procedure moves to steps S7 and S11, and movie signal and audio signal processing is started. In the present embodiment, the audio processing indicated by the processing flow from steps S7 to S10 and the movie processing indicated by the processing flow from steps S11 to S12 are executed in parallel at substantially the same time. If a start shooting instruction has not been given, the reception of a start shooting instruction is waited for.

In step S7, the voice extraction unit 104 extracts the videographer's voice from the audio signal captured in the back (B) channel. Details of this processing will be described later with reference to the flowchart in FIG. 7. The videographer voice data 105 extracted by the voice extraction unit 104 is output to the voice canceling units 106 for the respective sound capturing channels. Next, in step S8, the voice canceling units 106 for the respective sound capturing channels perform processing for canceling, in the input audio signals, the signal component correlated with the videographer voice data 105 extracted in step S7. According to this processing, an audio signal in which the videographer's voice has been canceled is generated for each sound capturing channel. Note that details of this processing will be described later with reference to the flowchart in FIG. 8.

In step S9, the audio signal generating unit 107 generates a 5.1ch surround audio signal from the audio signals in which the videographer's voice was canceled in step S8. Furthermore, the audio signal generating unit 107 acquires a signal allocation that corresponds to the sound capturing mode stored in the internal memory with reference to the voice signal allocation table, and allocates the videographer voice data 105 extracted in step S7 to channels in accordance with the acquired signal allocation. According to this processing, the videographer's voice is located at the sound image layout position specified by the sound capturing mode in the surround sound field. Details of this processing will be described later with reference to the flowchart in FIG. 9.

In step S10, the audio encoder 108 encodes the 5.1ch surround audio signal generated in step S9 into an appropriate default compression encoding format such as AAC or AC-3. Note that this processing is commonly performed in existing movie capturing apparatuses, and this known technology can be applied in the present embodiment as well.

Meanwhile, in step S11, the movie signal processing unit 116 generates a movie signal by processing digital pixel signals obtained by the movie ADC 115 performing analog/digital conversion on the analog signals for respective pixels output from the imaging device 114. In the generation of the movie signal, in accordance with a control signal output by the controller 112, the movie signal processing unit 116 performs movie signal processing such as resolution conversion, frame rate conversion, interlace/progressive conversion, gamma correction, camera shake correction, and movie manipulation. Note that these types of processing are commonly performed in existing movie capturing apparatuses, and this known technology can be applied in the present embodiment as well.

In step S12, the movie encoder 117 encodes the digital movie signal resulting from movie signal processing that was output by the movie signal processing unit 116 into an appropriate default encoding format such as MPEG-2 or MPEG-4 AVC. Note that this processing is commonly performed in existing movie capturing apparatuses, and this known technology can be applied in the present embodiment as well.

In step S13, the MUX 109 multiplexes the audio signal that was encoded in step S10 and the movie signal that was encoded in step S12 so as to match a movie stream format such as AVCHD, and stores the resulting signal in the movie data storage unit 110. Note that this processing is commonly performed in existing movie capturing apparatuses, and this known technology can be applied in the present embodiment as well.

In step S14, the controller 112 performs processing for checking whether or not an end shooting instruction exists in the input buffer of the operation unit 111. If an end shooting instruction has been given, the controller 112 transmits a control signal for ending shooting and sound capturing to the constituent elements, and ends the movie capturing processing. If an end shooting instruction has not been given, the controller 112 returns to the processing of steps S7 and S11 and continues performing the movie capturing processing.

Next, the processing for extracting the videographer's voice performed by the voice extraction unit 104 in step S7 will be described. FIG. 7 is a flowchart showing details of the videographer voice extraction processing.

First, in step S101, the voice extraction unit 104 determines whether or not the sound capturing mode instructed by the controller 112 is "natural mode". If the natural mode has been specified as the sound capturing mode, adjustment regarding the sound image of the videographer's voice is not to be performed, and therefore this processing ends without further processing, and the main flow is returned to. If the sound capturing mode is not the natural mode, the procedure moves to step S102.

The analog audio signal picked up by the back (B) channel microphone unit 100 is amplified by the microphone amplifier 101 and then converted into a digital signal by the ADC 102, thus generating a digital audio signal. In step S102, the voice extraction unit 104 determines whether or not the amplitude level of the generated audio signal is higher than a predetermined threshold value. Here, the predetermined threshold value is recorded in a memory in the voice extraction unit 104 in advance. Normally, when the videographer speaks while holding the movie capturing apparatus in position, the sound pressure level of the videographer's voice, that is to say the amplitude level thereof, is higher than a certain given level. In the processing in step S102, it is determined whether or not the amplitude level of the audio signal captured by the back channel (B channel) is higher than or equal to the given level. If the amplitude level of the audio signal is higher than or equal to the threshold value, the procedure moves to step S103. However, if the amplitude level of the audio signal is not higher than or equal to the threshold value, it is determined that the videographer voice signal does not exist, and the voice extraction processing is ended without outputting anything.

In step S103, the voice extraction unit 104 performs FFT on the input back channel digital audio signal for conversion into a frequency domain signal. Note that this processing is commonly performed in audio signal processing, and this known technology can be applied in the present embodiment as well.

In step S104, the voice extraction unit 104 performs processing for investigating whether or not the spectral shape of the audio signal converted into the frequency domain in step S103 is a voice pattern. For example, the spectral outer shape is expressed in mel-frequency cepstral coefficients, a likelihood is calculated by comparison with a pre-learned statistical model, and whether or not the spectral shape corresponds to a voice is determined based on the likelihood. This processing is commonly performed in the field of voice recognition, and this known technology can be applied in the present embodiment as well. If the result of this investigation is that the spectral shape is determined to correspond to a voice, the procedure moves to step S105. If the spectral shape is determined to not correspond to a voice, the videographer voice extraction processing is ended.

In step S105, the voice extraction unit 104 determines the frequency band of the voice included in the frequency domain audio signal, and uses a bandpass filter to extract the audio signal in that frequency band as the videographer voice data 105. The frequency band of the voice (the band that includes the voice) is determined using a method such as estimating the voice band based on time variation in the line spectrum, or detecting a harmonic structure that is based on a fundamental frequency. This processing is commonly performed in the field of voice recognition, and this known technology can be applied in the present embodiment as well. Next, in step S106, the voice extraction unit 104 outputs the videographer voice data 105 that was extracted in step S105 to the voice canceling units 106 for the respective input channels. When the above processing ends, the videographer voice extraction processing is ended, and the main flow is returned to.

Next, the videographer voice cancelation processing performed by the voice canceling units 106 will be described. FIG. 8 is a flowchart showing details of the videographer voice cancelation processing in step S7. This processing is performed separately and simultaneously by the voice canceling units 106 for the respective sound capturing channels.

First, in step S201, the voice canceling unit 104 determines whether or not the videographer voice data 105 has been output. If the videographer voice data 105 output from the voice extraction unit 104 exists, the procedure moves to step S202. If the videographer voice data 105 does not exist, the videographer voice cancelation processing ends without further processing, and the main flow is returned to.

In step S202, the voice canceling unit 106 calculates the cross-correlation between the videographer voice data 105 and the corresponding sound capturing channel audio signal. If the videographer's voice is included in the audio signal of the corresponding sound capturing channel, a strong cross-correlation signal for the videographer voice data 105 and the audio signal is detected. In step S203, the voice canceling unit 106 detects the correlation signal having the highest amplitude among the cross-correlation signals calculated in step S202, and, based on the detection result, calculates the signal level of the signal containing the videographer's voice in the audio signal of the input channel and the delay from the extracted videographer's voice.

In step S204, the voice canceling unit 106 generates an opposite phase signal for the videographer's voice, performs level adjustment such that the signal level matches the signal level calculated in step S203, and performs time adjustment based on the delay calculated in step S203, thus generating a videographer voice cancelation signal. In step S205, the voice canceling unit 106 adds the videographer voice cancelation signal generated in step S204 to the audio signal of the corresponding sound capturing channel. According to this processing, the videographer's voice with the highest correlation is canceled, that is to say, the videographer's voice that was picked up as direct sound by the microphone units 100 of the respective channels is canceled. When the above processing ends, the videographer voice cancelation processing is ended, and the main flow is returned to.

The above-described videographer voice cancelation processing is performed separately for each sound capturing channel, thus making it possible to separately correct the level and delay of the videographer's voice, which change depending on the locations of the microphone units. For this reason, it is possible to more reliably cancel the videographer's voice in each of the sound capturing channel audio signals.

Next, surround audio signal generation processing performed by the audio signal generating unit 107 will be described. FIG. 9 is a flowchart showing details of surround audio signal generation processing performed by the audio signal generating unit 107 in step S8.

First, in step S301, the audio signal generating unit 107 passes the audio signals of the respective sound capturing channels output from the voice canceling units 106 through an LPF whose cutoff frequency is approximately 100 Hz so as to extract the low-frequency component with a frequency of 100 Hz and lower. An LFE signal is then generated by adding the low frequency signals of the audio signals of the four sound capturing channels to the low-frequency component extracted by the LPF. This processing is commonly performed in the field of surround audio processing, and this known technology can be applied in the present embodiment as well.

In step S302, the audio signal generating unit 107 composites a 5ch surround audio signal by performing linear combination on the audio signals of the sound capturing channels with a predetermined ratio. For example, a 5ch surround audio signal can be composited from four channels of audio signals as shown by Equation 3 below.

$$C = F$$

$$FL = 0.7 \times L + 0.3 \times F$$

$$FR = 0.7 \times R + 0.3 \times F$$

$$SL = 0.3 \times L + 0.7 \times B$$

$$SR = 0.3 \times R + 0.7 \times B \qquad \text{Equation 3}$$

This channel mixing processing is commonly performed in the field of surround audio signal processing, and this known technology can be applied in the present embodiment as well. When the above processing ends, the procedure moves to step S303.

In step S303, the audio signal generating unit 107 checks whether or not the sound capturing mode instructed by the controller 112 in step S4 is the natural mode. As previously described, the instructed sound capturing mode is stored in a memory in the audio signal generating unit 107, and it is sufficient to check that value. If the sound capturing mode is the natural mode, the procedure moves to step S305, and if the sound capturing mode is not the natural mode, the procedure moves to step S304.

In step S304, the audio signal generating unit 107 allocates and adds the videographer voice data 105 extracted in step S7 to the five channels of the surround audio signal in accordance with the allocation that corresponds to the sound capturing mode. As previously described, the various sound capturing modes and videographer voice channel allocations that correspond to the sound capturing modes (the voice signal allocation table shown in FIG. 11) are stored in a memory in the audio signal generating unit 107. The audio signal generating unit 107 acquires the videographer voice channel allocation that corresponds to the sound capturing mode from the voice signal allocation table, determines the allocation of the videographer's voice to the respective channels, and adds the videographer's voice to the audio signals of the respective channels. For example, if the sound capturing mode is the any layout mode, the videographer voice data 105 is added to FR with an amplitude level of 60.5%, and to SR with an amplitude level of 39.5%.

In step S305, the audio signal generating unit 107 adds the LFE signal generated in step S301 to the 5ch signal generated in steps S302 and S304 to obtain a surround audio signal, and outputs the surround audio signal to the MUX 109. When the above processing ends, the surround audio signal generation processing is ended, and the main flow is returned to.

As described above, according to the movie capturing apparatus of the first embodiment, it is possible to appropriately extract the videographer's voice from an input audio signal. It is then possible to cancel the videographer's voice in the various input audio signal channels using the extracted voice, and obtain a surround sound field that does not include the videographer's voice. Then, the extracted videographer sound image is located at a specified position in the surround sound field that corresponds to the sound capturing mode, thus making it possible to reproduce the videographer sound image at a position desired by the user. Also, in the any layout mode, the videographer sound image can be located at any position specified by the videographer. Accordingly, the videographer sound image can be appropriately located at a position desired by the user, without forcing the user to perform complicated operations.

Also, according to the above embodiment, the videographer's voice can be separated out and located at any position, thus making it possible to reproduce favorable surround sound in which the videographer's voice does not interfere with ambient sounds or the subject's voice. Also, since a preferred mode can be selected from among various sound capturing modes, the videographer's voice can be located at a preferred position without requiring troublesome settings.

Second Embodiment

In the configuration of the first embodiment, it is envisioned that the videographer is located rearward of the movie capturing apparatus, and the videographer voice data is extracted from the audio signal obtained from the back channel (B channel) microphone unit 100. In the second embodiment, the videographer's position is extracted based on audio signals obtained from multiple microphone units of the sound capturing unit 2, thus making it possible to execute various sound capturing modes regardless of the direction in which the videographer is located relative to the movie capturing apparatus.

Figure 5:
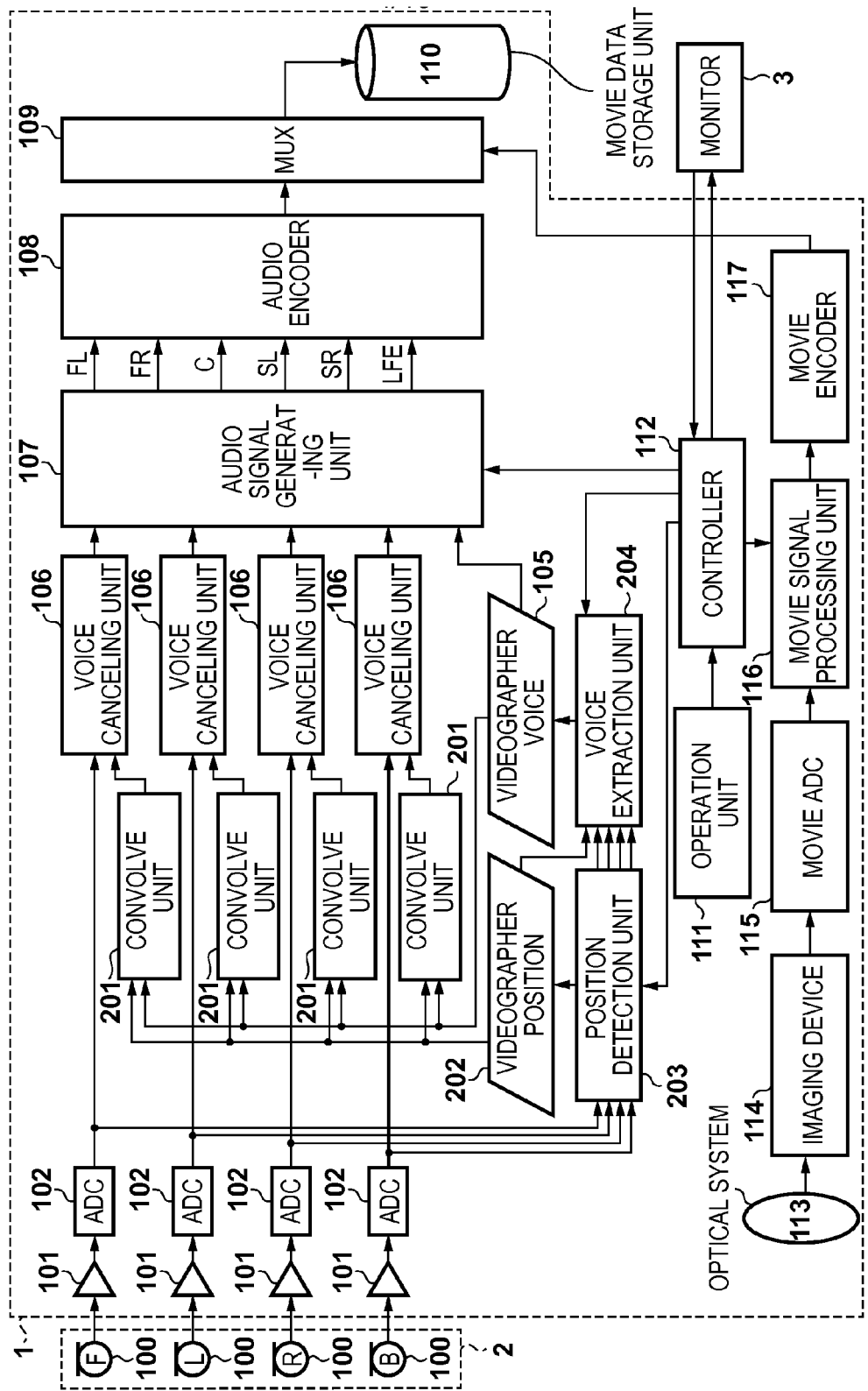
FIG. 5 is a block diagram showing an example of a configuration of a movie capturing apparatus according to a second embodiment.

FIG. 5 is a block diagram showing an example of the configuration of the movie capturing apparatus according to the second embodiment. In FIG. 5, constituent elements having the same functions as constituent elements shown in FIG. 3 are indicated by the same reference signs.

Convolve units 201 determine a correction transmission function for correcting change in frequency characteristics caused by the shape of the casing and the like, based on the positional relationship between the position indicated in the videographer position data 202 and the microphones that captured the audio signals of the respective sound capturing channels. The convolve units 201 convolve the determined correction transmission functions with the videographer voice data 105, and output the obtained videographer voice data to the voice canceling units 106. The videographer position data 202 is information indicating the videographer position calculated by a position detection unit 203. Accordingly, although the videographer position data 202 is not a constituent element, it is shown in the drawings to facilitate understanding of the description. The position detection unit 203 detects the position of the videographer based on the amplitude levels and phases of the audio signals of the various sound capturing channels. A voice extraction unit 204 extracts the videographer's voice based on the audio signals of all of the sound capturing channels.

Figure 12:
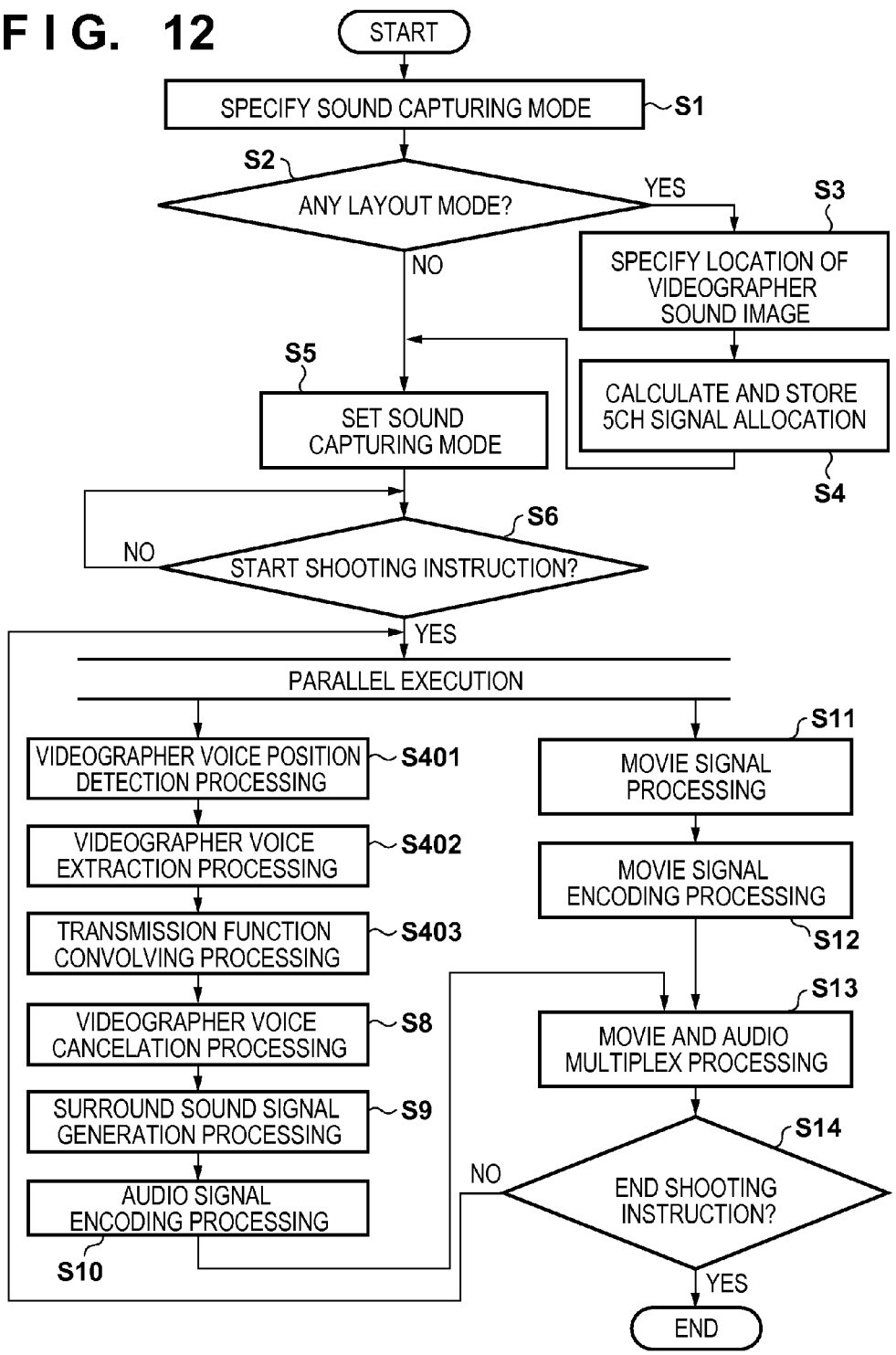
FIG. 12 is a flowchart showing movie capturing processing according to the second embodiment.

The following describes audio signal processing and movie signal processing in the movie capturing apparatus of the second embodiment with reference to the flowchart of FIG. 12. FIG. 12 is a flowchart showing overall movie capturing processing performed by the movie capturing apparatus according to the second embodiment. The flowchart shown in FIG. 12 is the flowchart shown in FIG. 6 with partial changes made according to the configuration shown in FIG. 5. In FIG. 12, steps for performing the same processing as in FIG. 6 are indicated by the same step numbers as in FIG. 6. Note that in the second embodiment, the audio signal processing from steps S401 to S10 and the movie signal processing from steps S11 to S12 are executed in parallel at substantially the same time.

In step S401, the position detection unit 203 analyzes the audio signals of all of the sound capturing channels, and detects and outputs the videographer position. Details of this processing will be described later with reference to the flowchart in FIG. 13. Next, in step S402, the voice extraction unit 204 extracts the videographer voice data 105 from the audio channel signals based on the videographer position data 202 detected in step S401. Details of this processing will be described later with reference to the flowchart in FIG. 14.

In step S403, the convolve units 201 generate transmission function correction signals that correspond to the microphone positions in the respective sound capturing channels based on the videographer position data 202, and correct the videographer voice data 105 by convolving with the transmission function correction signals. Audio signal correction transmission functions corresponding to videographer positions in the respective sound capturing channels are stored in tables in memories in the convolve units 201. For example, correction transmission functions are registered for sections at 30 degree intervals from the forward direction in FIG. 2, and a correction transmission function is selected by searching the table using the videographer position data 202 as the key. Next, the convolve units 201 convolve the selected correction transmission functions with the videographer voice data 105, and output the resulting videographer voice data 105 to the voice canceling units 106. According to this processing, the videographer voice data 105 input to the voice canceling units 106 for the respective sound capturing channels is corrected with consideration given to the influence of the videographer position. For this reason, in the videographer voice cancelation processing in step S8, it is possible to more precisely cancel the videographer's voice in the audio signals.

Figure 13:
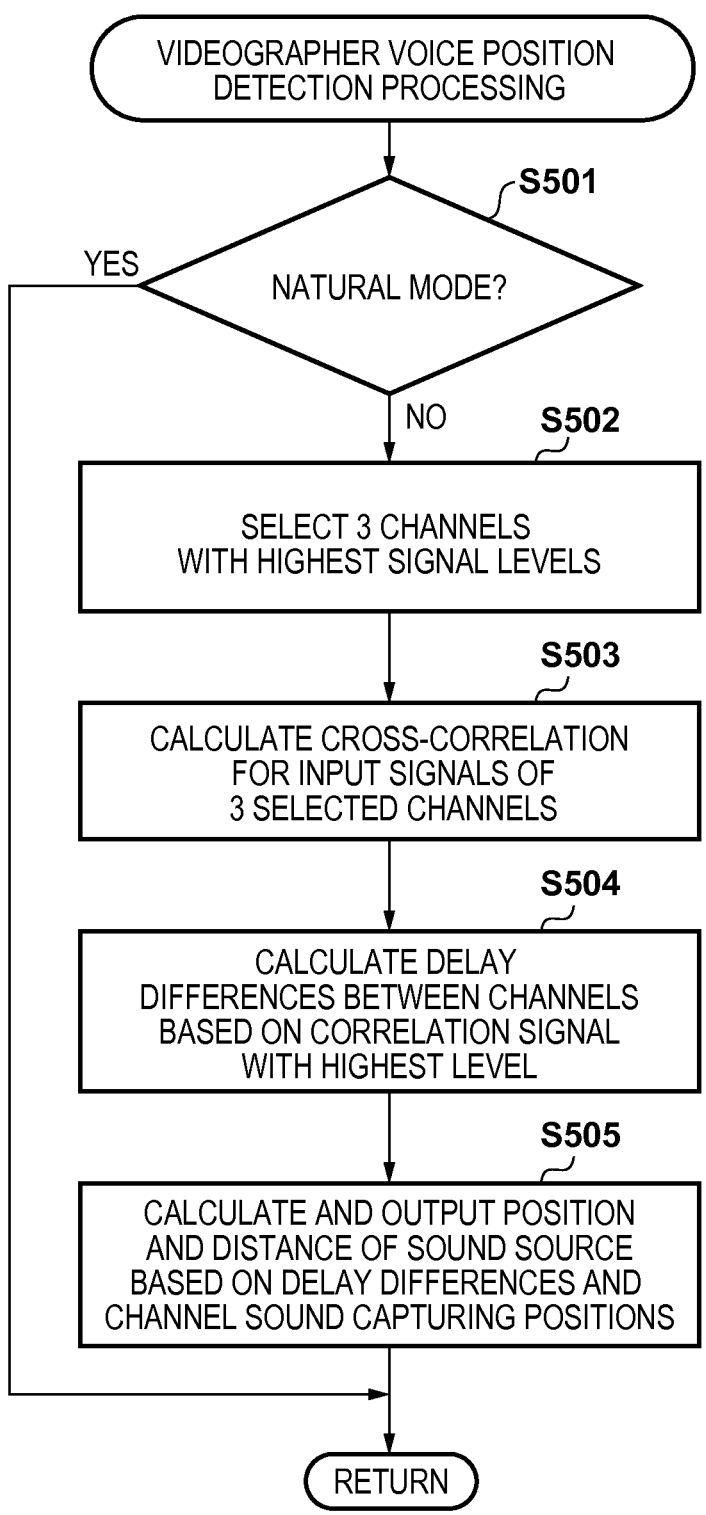
FIG. 13 is a flowchart showing position detection processing according to the second embodiment.

FIG. 13 is a flowchart showing details of videographer voice position detection processing (step S401) in the second embodiment. The processing shown in this flowchart is executed by the position detection unit 203.

In step S501, the position detection unit 203 checks whether or not the sound capturing mode stored in an internal memory is the natural mode. Note that in step S5 of FIG. 12, it is assumed that the instructed sound capturing mode is stored in an internal memory of the position detection unit 203 in advance. If the result of this check is that the sound capturing mode is the natural mode, the videographer voice position detection processing ends without further processing, and the main flow is returned to. On the other hand, if the sound capturing mode is not the natural mode, the procedure moves to step S502.

In step S502, the position detection unit 203 selects three channel signals in order of highest signal level from among the audio signals of the four sound capturing channels. In step S503, the position detection unit 203 creates three sets of a combination of two of the three channel input signals selected in step S502, and calculates a cross-correlation for each of the three sets. In step S504, the position detection unit 203 extracts the correlation signal with the highest level from among the three cross-correlation signals calculated in step S503, and calculates delay differences between the three selected channels based on the extracted correlation signal. Note that this processing is commonly performed in sound source search processing, and this known technology can be applied in the present embodiment as well.

In step S505, the position detection unit 203 calculates the direction of the sound source based on the delay differences calculated in step S504 and the layout positions of the microphone units that captured the audio signals of the three selected channels. This processing is commonly performed in sound source search processing, and this known technology can be applied in the present embodiment as well. The calculated direction information is output as the videographer position data 202. When the above processing ends, the videographer voice position detection processing is ended, and the main flow is returned to.

FIG. 14 is a flowchart showing details of videographer voice extraction processing (step S402) in the second embodiment. The processing shown in this flowchart is executed by the voice extraction unit 204. Note that the flowchart shown in FIG. 14 is the flowchart for videographer voice extraction processing of the first embodiment (FIG. 7) with partial changes, and steps in FIG. 14 for performing the same processing as in FIG. 7 (steps from step S103 onward) are indicated by the same step numbers.

In step S601, the voice extraction unit 204 checks whether or not the videographer position data 202 has been output from the position detection unit 203, that is to say, whether or not the videographer position data 202 has been output in step S403. If the videographer position data 202 has been output, the procedure moves to step S602. If the videographer position data 202 has not been output, the voice extraction processing is ended without further processing, and the main flow is returned to.

In step S602, the voice extraction unit 204 composites the audio signals of the four sound capturing channels so as to intensify the videographer's voice based on the direction and distance indicated by the videographer position data 202. For example, the amplitude levels of the audio signals of the four channels are adjusted based on the direction of the videographer's voice so as to intensify the directionality in that direction. Additionally, or alternatively, delay adjustment is performed so as to match the delays related to the videographer's voice in the audio signals of the four channels in accordance with the distance between the videographer's voice and the microphone units of the respective channels, for example. By adding the audio signals of the four channels after performing adjustment as described above, it is possible to composite a signal so as to emphasize the videographer's voice. Note that this processing is commonly performed in the field of sound source extraction, and this known technology can be applied in the present embodiment as well.

In step S603, the voice extraction unit 204 checks whether or not the amplitude level of the audio signal composited in step S602 is higher than a predetermined amplitude level threshold value. The amplitude level threshold value is stored in a predetermined region of an internal memory of the voice extraction unit 204 in advance. If the amplitude level of the composited audio signal is higher than the threshold value, the procedure moves to step S103. Otherwise, it is deemed that the videographer's voice has not been captured, the videographer voice extraction processing is ended without further processing, and the main flow is returned to.

As described above, in the second embodiment, even if the videographer is located at an arbitrary direction other than rearward relative to the movie capturing apparatus, it is possible to automatically detect the direction and distance of the videographer and appropriately extract the videographer's voice based on the detected information.

Also, in the second embodiment, videographer voice cancelation processing is performed based on the videographer voice data in which the transmission functions have been corrected according to the videographer's direction, thus making it possible to generate an ideal surround sound field foundation in which the videographer's voice has been canceled more precisely. Also, by then locating the videographer's voice at a location desired by the user, it is possible to realize the reproduction of a more ideal surround sound field. Note that the configuration for convolving the correction transmission functions may obviously be added to the configuration of the first embodiment. In this case, the correction transmission functions of the sound capturing channels are fixed functions set based on the positional relationship between the microphones and the videographer located rearward of the movie capturing apparatus.

Third Embodiment

Figure 17:
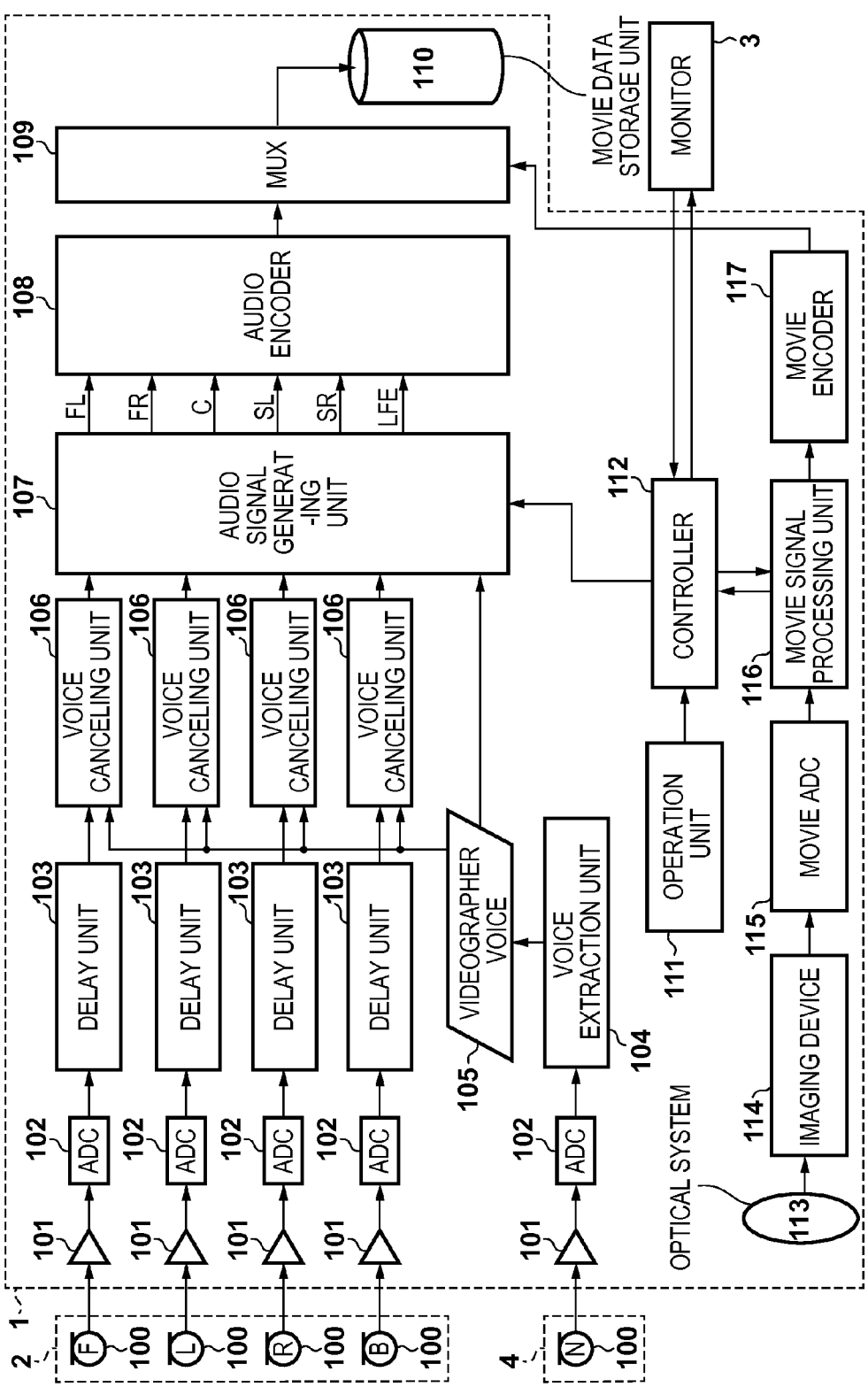
FIG. 17 is a block diagram showing an example of a configuration of the movie capturing apparatus according to the third embodiment.

In the examples described in the above first and second embodiments, the videographer's voice is extracted from audio signals captured by the sound capturing unit 2 provided on the upper portion of the casing, but the present invention is not limited to this. The configuration described in the third embodiment is an example of a variation in which a unidirectional microphone unit for mainly capturing the videographer's voice is provided on the rear portion of the casing body 1, and the videographer's voice is extracted from the signal captured by this microphone unit. FIG. 16 is a schematic diagram showing the exterior of a movie capturing apparatus according to the third embodiment. In FIG. 16, a microphone 4 is a unidirectional microphone for capturing the videographer's voice. Also, FIG. 17 is a block diagram showing an example of the configuration of the movie capturing apparatus according to the third embodiment. Note that although the various types of processing performed by the movie capturing apparatus of the third embodiment are similar to that in the first embodiment, the videographer's voice is extracted from the audio signal obtained by the microphone 4, instead of the videographer's voice being extracted from the back channel (B channel) audio signal. Furthermore, the audio signal obtained by the microphone 4 is not used in the generation of surround sound by the audio signal generating unit 107. In other words, by performing processing similar to that in the first embodiment with the exception of generating the videographer voice data 105 from the audio signal obtained by the microphone 4, it is possible to realize locating the videographer's voice at any position.

Other Embodiments

Although the sound capturing unit 2 has a 4ch microphone configuration in the above embodiments, the present invention can be similarly applied to, for example, a 5ch microphone configuration in which surround sound is obtained by capturing five channels that are not mixed together.

Also, although the videographer's voice is located in the surround sound field in all of the sound capturing modes in the above embodiments, there is no limitation to this. For example, a sound capturing mode may be provided in which the videographer's voice is canceled out and then not relocated in the surround sound field (videographer voice cancelation mode).

Also, the present invention can be embodied as a system, an apparatus, a method, a program, or a recording medium (storage medium), for example. Specifically, the present invention may be applied to a system configured by multiple devices (e.g., a host computer, an interface device, an imaging device, and a web application, etc.), or may be applied to an apparatus made up of one device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-010731, filed Jan. 23, 2014, which is hereby incorporated by reference herein in its entirety.

What is claimed is:

1. An audio signal processing apparatus comprising:
one or more processors; and
one or more memories coupled to the one or more processors, the one or more memories having instructions stored thereon which, when executed by the one or more processors, cause the audio signal processing apparatus to:
acquire a specific audio signal based on at least one of audio signals of a plurality of sound capturing channels captured by a plurality of microphones;
cancel a signal corresponding to the specific audio signal in the audio signals of each of the plurality of sound capturing channels;
allow a user to specify a position or a direction for locating the specific audio signal in a surround audio field; and
generate a surround audio signal corresponding to at least three directions, such that a sound source of the specific audio signal is located at the specified position or direction in the surround sound field, using the specific audio signal and the audio signals in which the signal corresponding to the specific audio signal was canceled.

2. The audio signal processing apparatus according to claim 1, wherein the execution of the instructions by the one or more processors further causes the audio signal processing apparatus to acquire the specific audio signal from an audio signal of a specific sound capturing channel among the plurality of sound capturing channels, based on a sound pressure level and a spectral shape of the audio signal of the specific sound capturing channel.

3. The audio signal processing apparatus according to claim 2, wherein the specific sound capturing channel is one of the sound capturing channels to be used in generating the surround audio signal.

4. The audio signal processing apparatus according to claim 2, wherein the specific sound capturing channel is a sound capturing channel different from the sound capturing channels to be used in generating the surround audio signal.

5. The audio signal processing apparatus according to claim 4, wherein microphones corresponding to the sound capturing channels to be used in surround audio signal generation are omnidirectional, and a microphone corresponding to the specific sound capturing channel has unidirectionality.

6. The audio signal processing apparatus according to claim 1, wherein the execution of the instructions by the one or more processors further causes the audio signal processing apparatus to:
determine a position of a sound source of the specific audio signal based on the audio signals of the plurality of sound capturing channels;
composite the audio signals of the plurality of sound capturing channels such that an audio signal corresponding to a direction of the determined position of the sound source is emphasized; and
acquire the specific audio signal from a composited audio signal.

7. The audio signal processing apparatus according to claim 6, wherein the execution of the instructions by the one or more processors further causes the audio signal processing apparatus to acquire the specific audio signal from the composited audio signal based on a sound pressure level and a spectral shape of the composited audio signal.

8. The audio signal processing apparatus according to claim 1, wherein the execution of the instructions by the one or more processors further causes the audio signal processing apparatus to correct the specific audio signal for each sound capturing channel based on a relationship between a position of a sound source of the specific audio signal and positions of the microphones corresponding to the sound capturing channels to be used in generating the surround audio signal.

9. The audio signal processing apparatus according to claim 1, wherein the execution of the instructions by the one or more processors further causes the audio signal processing apparatus to allow a user to select one of a plurality of sound capturing modes each defining a position or a direction of a sound source of the specific audio signal in the surround audio signal.

10. The audio signal processing apparatus according to claim 1, wherein the execution of the instructions by the one or more processors further causes the audio signal processing apparatus to display a surround loudspeaker layout diagram on a touch panel display device, and determine the specified position or direction based on a position instructed by the user on the surround loudspeaker layout diagram.

11. A movie capturing apparatus comprising:
a plurality of microphones;
an audio signal processing apparatus comprising:
one or more first processors; and
one or more first memories coupled to the one or more first processors, the one or more first memories having instructions stored thereon which, when executed by the one or more first processors, cause the audio signal processing apparatus to:
acquire a specific audio signal based on at least one of audio signals of a plurality of sound capturing channels captured by the plurality of microphones;
cancel a signal corresponding to the specific audio signal in the audio signals of each of the plurality of sound capturing channels;
allow a user to specify a position or a direction for locating the specific audio signal in a surround audio field; and
generate a surround audio signal corresponding to at least three directions, such that a sound source of the specific audio signal is located at the specified position or direction in the surround sound field, using the specific audio signal and the audio signals in which the signal corresponding to the specific audio signal was canceled;
an image capturing device configured to capture moving images simultaneously with audio capturing performed by the plurality of microphones;
one or more second processors; and
one or more second memories coupled to the one or more second processors, the one or more second memories having instructions stored thereon which, when executed by the one or more second processors, cause the movie capturing apparatus to generate movie data with voice based on a movie signal generated from the moving images captured by the image capturing device and the surround audio signal generated by the audio signal processing apparatus.

12. A movie capturing apparatus comprising:
a plurality of microphones;
an audio signal processing apparatus comprising:
one or more first processors; and
one or more first memories coupled to the one or more first processors, the one or more first memories having instructions stored thereon which, when executed by the one or more first processors, causes the audio signal processing apparatus to:
acquire a specific audio signal based on at least one of audio signals of a plurality of sound capturing channels captured by a plurality of microphones;
cancel a signal corresponding to the specific audio signal in the audio signals of each of the plurality of sound capturing channels;
allow a user to specify a position or a direction for locating the specific audio signal in a surround audio field; and
generate a surround audio signal corresponding to at least three directions, such that a sound source of the specific audio signal is located at the specified position or direction in the surround sound field, using the specific audio signal and the audio signals in which the signal corresponding to the specific audio signal was canceled,
wherein the audio signal processing apparatus acquires the specific audio signal from an audio signal of a specific sound capturing channel among the plurality of sound capturing channels, based on a sound pressure level and a spectral shape of the audio signal of the specific sound capturing channel, and wherein the specific sound capturing channel is one of the sound capturing channels to be used in generation of the surround audio signal;

an image capturing device configured to capture moving images simultaneously with audio capturing performed by the plurality of microphones;

one or more second processors; and one or more second memories coupled to the one or more second processors, the one or more second memories having instructions stored thereon which, when executed by the one or more second processors, causes the movie capturing apparatus to generate movie data with voice based on a movie signal generated from the moving images captured by the image capturing device and the surround audio signal generated by the audio signal processing apparatus, wherein the specific sound capturing channel is a sound capturing channel corresponding to a microphone, among the plurality of microphones, disposed at a farthest position from a shooting lens of the image capturing device.

13. An audio signal processing method comprising:

acquiring a specific audio signal based on at least one of audio signals of a plurality of sound capturing channels captured by a plurality of microphones;

canceling a signal corresponding to the specific audio signal in the audio signals of each of the plurality of sound capturing channels;

allowing a user to specify a position or a direction for locating the specific audio signal in a surround audio field; and generating a surround audio signal corresponding to at least three directions, such that a sound source of the specific audio signal is located at the specified position or direction in the surround sound field, using the specific audio signal and the audio signals in which the signal corresponding to the specific audio signal was canceled.

14. A non-transitory computer readable medium storing a program for causing a computer to execute an audio signal processing method comprising:

acquiring a specific audio signal based on at least one of audio signals of a plurality of sound capturing channels captured by a plurality of microphones;

canceling a signal corresponding to the specific audio signal in the audio signals of each of the plurality of sound capturing channels;

allowing a user to specify a position or a direction for locating the specific audio signal in a surround audio field; and generating a surround audio signal corresponding to at least three directions, such that a sound source of the specific audio signal is located at the specified position or direction in the surround sound field, using the specific audio signal and the audio signals in which the signal corresponding to the specific audio signal was canceled.

* * * * *